(No Model.)
A. NILSEN.
SQUARE AND PROTRACTOR FOR BUILDERS' USE.
No. 339,682. Patented Apr. 13, 1886.
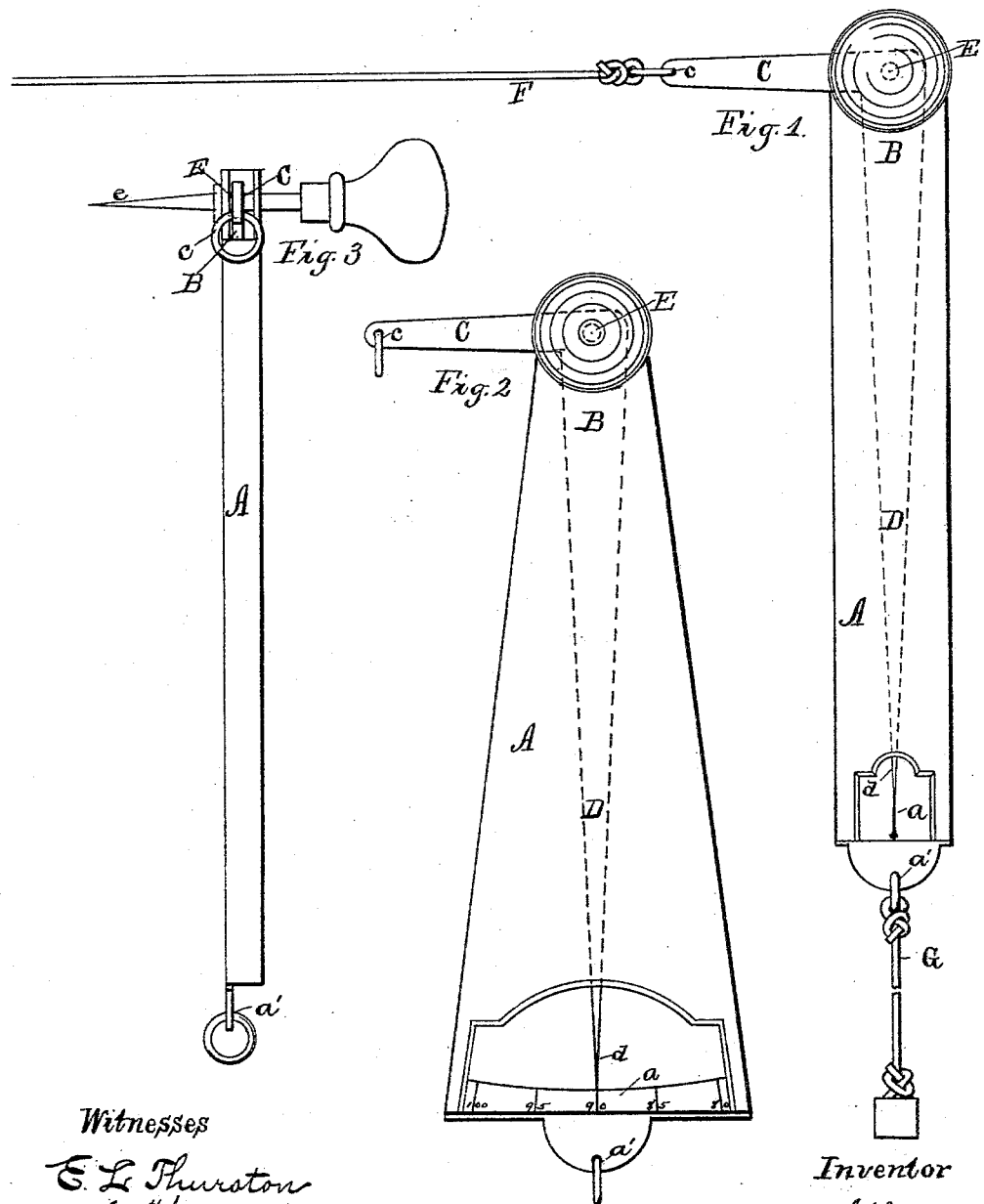

UNITED STATES PATENT OFFICE.

ANDERS NILSEN, OF JEFFERSON, ILLINOIS.

SQUARE AND PROTRACTOR FOR BUILDERS' USE.

SPECIFICATION forming part of Letters Patent No. 339,682, dated April 13, 1886.

Application filed August 24, 1885. Serial No. 175,249. (No model.)

*To all whom it may concern:*

Be it known that I, ANDERS NILSEN, of the town of Jefferson, in the county of Cook and State of Illinois, have invented certain new and useful Improvements in Squares and Protractors, of which the following is a description, reference being had to the accompanying drawings, in which—

Figure 1 is a plan view of my improved device. Fig. 2 is a plan view of another form thereof, and Fig. 3 is a side view.

Like letters represent similar parts in the several figures.

My invention is designed principally for the use of builders and carpenters. By its use builders are able to lay off the base of their foundations with greater accuracy than is possible by eye, and with less expense than can be done by a surveyor, and carpenters are able to make the sides of their work straight and the angles true. It is also applicable to a variety of other analogous uses.

The object of my invention is to provide a a simple and inexpensive device, whereby meeting lines may be accurately laid out, so that they shall lie at any desired angle with each other.

To this end it consists of a two-arm lever, preferably with the arms at right angles to each other, one arm of which lever has means whereby a line may be attached thereto, while the other arm is sharpened to form a pointer or indicator, pivoted at the junction of said arms to a straight arm or plate, having at its free end a graduated dial, and means whereby a line may be attached thereto, and means for fixing the device at the pivotal point above mentioned to the surface upon which the angle is to be laid off, and in the various sub-combinations to be herein more fully described, and definitely pointed out in the claims.

In the drawings, A represents an arm or plate, and B a bent lever provided with the two arms C and D. The plate A and two-arm lever B are pivoted together by means of the pivot E at one end of the plate A, and at the intersection of the two arms of the lever B. One arm, D, of said lever is sharpened at its free end, to form the pointer $d$, and the other arm, C, is provided with means, preferably the ring $c$, at its free end, to which a line, F, may be attached. In the preferable form the two arms C and D of the lever B lie so that a line passed through the pointer $d$ and the pivot E shall be at right angles to a line passing through said pivot and the point of the arm C, to which the line F is attached. The plate A is provided at its free end with a graduated dial, $a$, and with means, preferably the ring $a'$, for attaching a line, G.

Upon the underside of the device some means must be provided for fixing the device at its pivotal point to the surface upon which the lines are to be laid off, and directly over the point designed to be the meeting-point of such lines. As the preferable means, I continue the pivot E through on its under side and form the point $e$. Of course it is not absolutely necessary that the device be fixed to the surface. It may be held above the proposed meeting-point of the lines; but as accuracy is one of the points aimed at in constructing the above device, this is not considered a desirable mode of operation. It is evident that when the arms C and D of the lever B lie at right angles, if the free arm D lies in the direction of the line G, the lines F and G must also be at right angles. A line or mark upon the dial or plate A on a line between the pivot E and point of attachment of the line G will represent the right angle, or the angle made by the lines F and G, when the device is in operation and the pointer $d$ is on the mark. The amount of variation of said lines F and G from the right angle will be indicated by the deflection to the one side or the other of the pointer $d$ from the ninety-degree mark on the dial.

In operation the point $e$ is driven into the surface at the point designed to be the meeting-point of the lines to be laid off. The line G is thus carried in the direction it is designed to have it, drawn tightly, and fastened in that position. The line F is then carried in a direction thought to lie at about the desired angle to the line G. It is then drawn tight and moved to one side or the other until the pointer $d$ rests upon the mark on the dial indicating the desired angle.

The form of device shown in Fig. 1 is designed only to lay off right angles, to which purpose the device will most often be applied. If it is desired that the device shall be adapted to lay off other angles, it may be varied, as shown in Fig. 2, wherein the plate A is made more or less fan-shaped, with its free end the broader, and the angles are indicated on the dial, as shown. In the preferable form the arm D is inclosed in a flat box, of which the plate A forms the bottom. The upper side is cut away above the dial and a piece of glass is inserted, through which glass the dial and pointer may be seen. By this means the danger that the arm D may become bent is much decreased, and the value of the instrument correspondingly increased.

Having thus described my invention, what I claim as new, and desire to secure by Letters Patent, is—

1. The combination of a two-arm lever having at the end of one arm means for attaching a line, and having a pointer at the end of the other arm, with a plate having one end pivoted to said two-arm lever at the intersection of the arms thereof, and having at its free end a graduated dial and means for attaching a line thereto, substantially as and for the purpose set forth.

2. The combination of a two-armed lever having at the end of one arm means for attaching a line thereto, and having a pointer at the end of the other arm, with a plate pivoted to said lever at the intersection of the arms thereof, and having at its free end a dial and means for attaching a line to said plate, and means for attaching said device at its pivotal point to some external object, substantially as and for the purpose set forth.

3. The combination of a two-arm lever, having at the end of one arm means for attaching a line, and having a pointer upon the end of the other arm, with a hollow box pivoted to said lever at the intersection of the arms thereof, said box having at its free end means for attaching a line thereto, and having a dial upon the upper surface of its lower side and having its upper side cut away above said dial, substantially as and for the purpose set forth.

ANDERS NILSEN.

Witnesses:
T. C. THURSTON,
E. L. THURSTON.